(12) United States Patent
Vignati et al.

(10) Patent No.: US 11,402,852 B2
(45) Date of Patent: *Aug. 2, 2022

(54) OBJECT MANAGEMENT DISPLAY (71) Applicant: Florida Institute for Human and Machine Cognition, Inc., Pensacola, FL (US)

(72) Inventors: Micael Vignati, Pensacola, FL (US); Larry Bunch, Pensacola, FL (US); Jeffrey M. Bradshaw, Pensacola, FL (US); Matt Johnson, Pensacola, FL (US)

(73) Assignee: Florida Institute for Human & Machine Cognition, Inc., Pensacola, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,949

(22) Filed: Apr. 20, 2020

(65) Prior Publication Data
US 2020/0241562 A1 Jul. 30, 2020

Related U.S. Application Data (63) Continuation of application No. 15/463,242, filed on Mar. 20, 2017, now Pat. No. 10,627,832.

(60) Provisional application No. 62/310,154, filed on Mar. 18, 2016.

(51) Int. Cl.
*G05D 1/02* (2020.01)
*G06F 3/0481* (2022.01)
*G08G 1/00* (2006.01)
*G06F 3/04817* (2022.01)
*G06Q 10/10* (2012.01)
*G06Q 10/06* (2012.01)

(52) U.S. Cl.
CPC ....... *G05D 1/0291* (2013.01); *G06F 3/04817* (2013.01); *G08G 1/202* (2013.01); *G06Q 10/0631* (2013.01); *G06Q 10/109* (2013.01)

(58) Field of Classification Search
CPC ......... G06Q 10/0631; G06Q 10/06311; G06Q 10/109; G05D 1/0291; G06F 3/04817; G08G 1/202
See application file for complete search history.

(56) References Cited

U.S. PATENT DOCUMENTS 6,469,664 B1 * 10/2002 Michaelson ......... G01C 13/008
342/357.31

* cited by examiner

Primary Examiner — Peter D Nolan
Assistant Examiner — Demetra R Smith-Stewart
(74) Attorney, Agent, or Firm — J. Wiley Horton (57) ABSTRACT A graphical user interface allowing one or more users to rapidly perceive and respond to varying operational states. Glyphs depicting differing levels of detail are provided for a top-level manager versus a lower-level operator. As applied to the vehicle paradigm, each individual glyph presents information as to the vehicle's current assigned task, mode, state, status, and its progress in completing that task. Each display shows multiple glyphs representing multiple vehicles. A vehicle in need of attention rises in the depiction whereas a vehicle not needing attention remains in a low position.

10 Claims, 12 Drawing Sheets

OBJECT MANAGEMENT DISPLAY

CROSS-REFERENCES TO RELATED APPLICATIONS

This non-provisional patent application is a continuation of U.S. patent application Ser. No. 15/463,242, which is about to issue as U.S. Pat. No. 10,627,832.

STATEMENT REGARDING FEDERALLY SPONSORED RESEARCH OR DEVELOPMENT

Not applicable.

MICROFICHE APPENDIX

Not Applicable.

BACKGROUND OF THE INVENTION

1. Field of the Invention

The present invention pertains to the field of graphical user displays. More specifically, the invention comprises a graphical display for fleet managers and group managers that rapidly conveys relevant information to the user.

2. Description of the Related Art

The present invention is applicable to a wide variety of operations. One suitable application is the management of a fleet of moving vehicles. Accordingly, some prior art relevant to vehicle fleet management will be disclosed. Current fleet management primarily deals with operator-driven vehicles such as taxi cabs and delivery trucks. Automation is rapidly increasing in this field. Some autonomous vehicles are now in operation and autonomous vehicles are expected to become increasingly common. While autonomous vehicles are now largely confined to defined pathways (such as within a factory), they are eventually expected to become common on public roads and streets.

As automation increases, human management of autonomous vehicles will become less taxing. Fewer human operators will therefore be able to manage larger fleets of vehicles. However, it is likely that a requirement for human oversight and manual operation of an individual vehicle at a particular time will remain. Large fleets will likely be monitored and controlled by multiple human operators and a hierarchy among these operators may be advisable. A "group manager" in this context is an individual who is responsible for a subset of the entire fleet at any time. A "fleet manager" is responsible for the entire fleet and the group managers.

Figure 1:
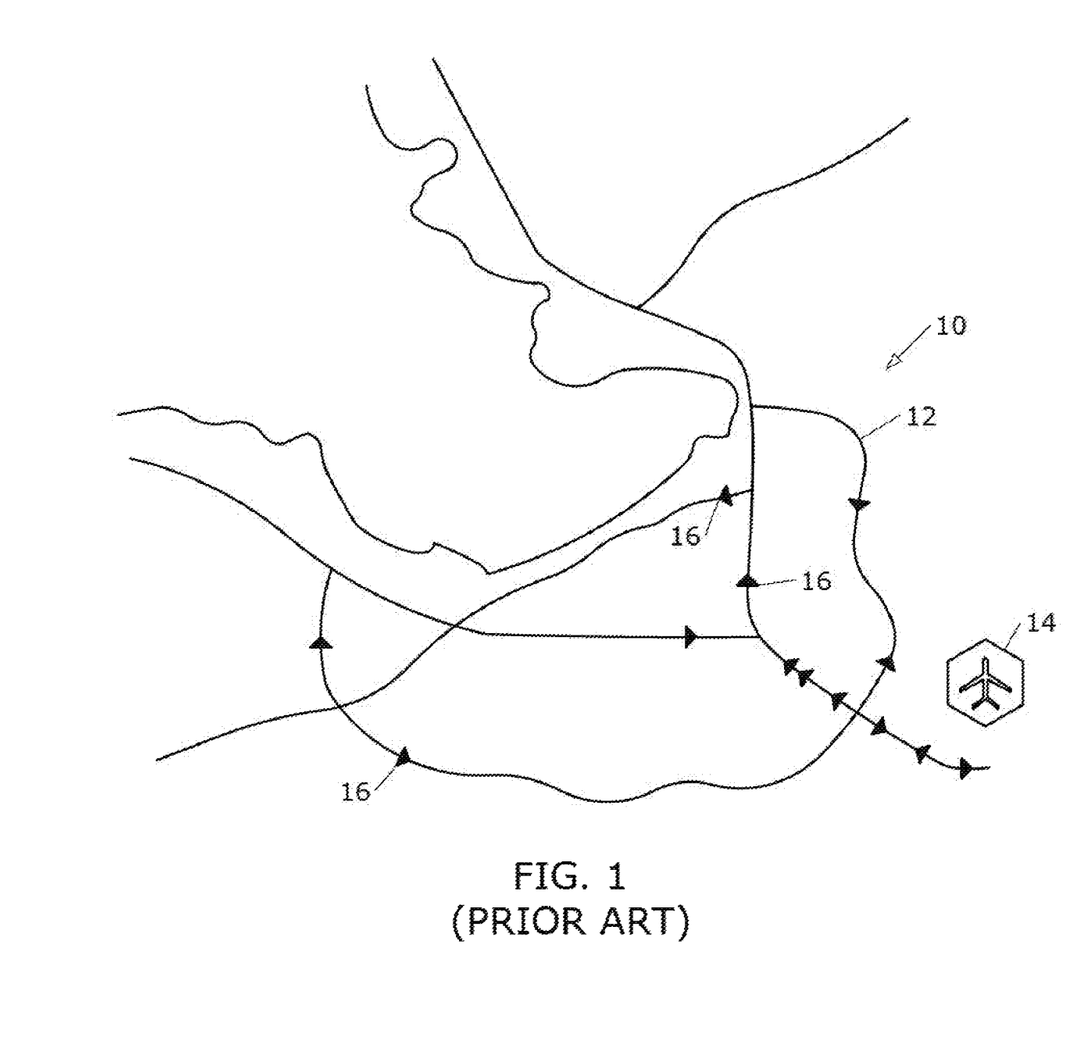
FIG. 1 depicts a prior art graphical user interface including a map with moving vehicle icons.

FIG. 1 depicts a representative prior art display that is suitable for use by a fleet manager. Map depiction 10 shows the area of a particular vehicle fleet's operation. Major roads 12 are depicted, as are points of interest 14 (in this case an airport). Vehicle icons 16 show the current location and direction of travel for each vehicle being tracked.

Figure 2:
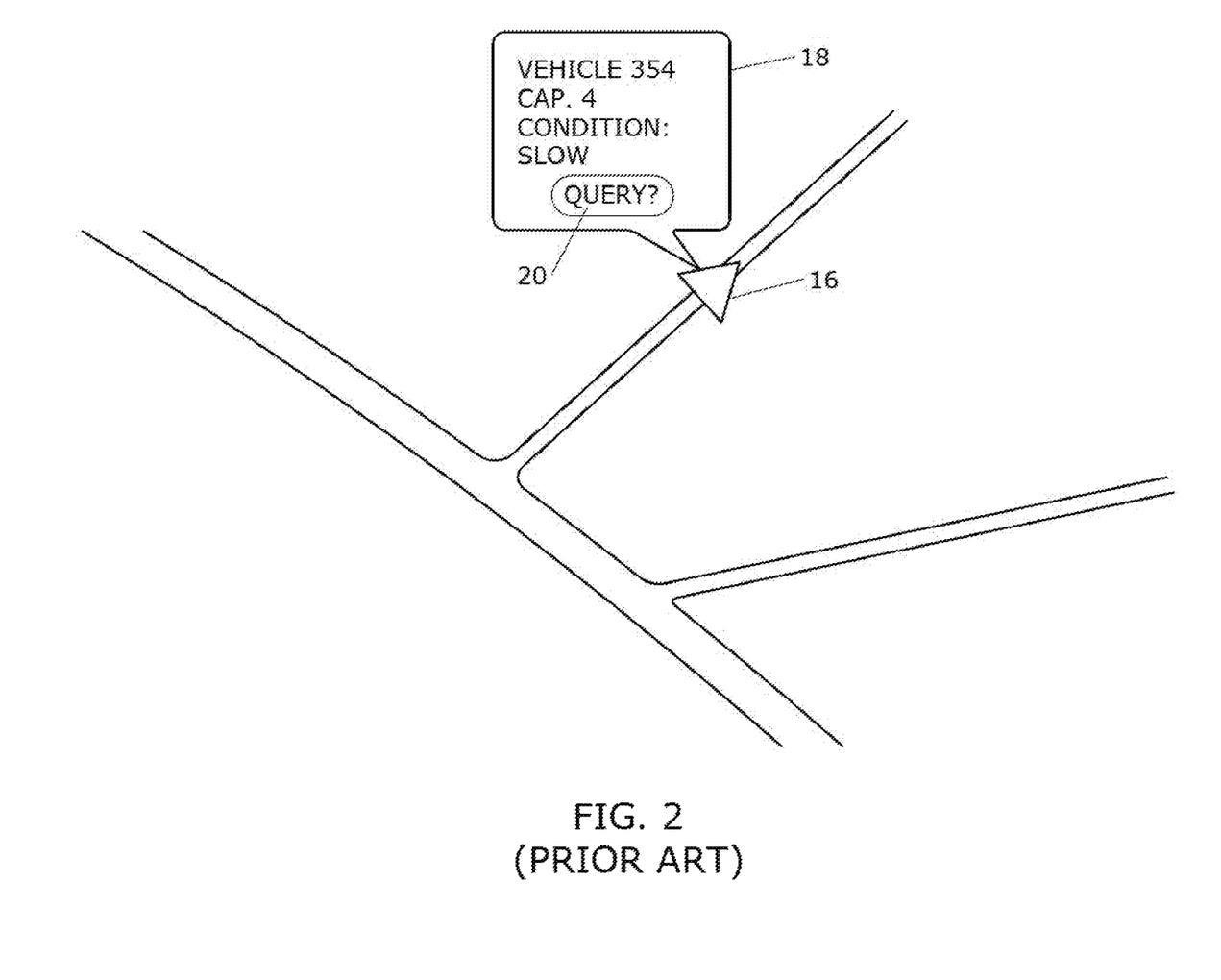
FIG. 2 depicts an enlargement of the view of FIG. 1, showing an individual vehicle and a dialog box showing vehicle details and actions.

More detail is often provided in response to clicking on a particular portion of the map or a particular vehicle icon. For example, a group manager may only be concerned with a subset of the available vehicles or a subset of the geographic area. FIG. 2 shows a more detailed view that pops up when a particular vehicle icon 16 is selected. Dialogue box 18 displays data pertaining to the selected vehicle and may provide one or more action buttons 20 allowing additional actions to be taken.

A graphical user interface such as shown in FIGS. 1 and 2 provides meaningful information to fleet managers and group managers. However it does little to reduce the work load. The human operator must scan and monitor all vehicles equally. The operator must also constantly make selections to learn more information. A more helpful interface would intuitively alert the user to vehicles needing attention. The present invention provides such an interface.

BRIEF SUMMARY OF THE INVENTION

The present invention comprises a graphical user interface allowing one or more users to rapidly perceive and respond to varying operational states. Glyphs depicting differing levels of detail are provided for a top-level fleet manager versus a lower-level group operator. As applied to the vehicle paradigm, each individual glyph presents information as to the vehicle's current assigned task, its progress in completing that task, and any alerts or concerns about the vehicle. Each display shows multiple glyphs representing multiple vehicles. A vehicle in need of attention rises in the depiction whereas a vehicle not needing attention remains in a low position.

REFERENCE NUMERALS IN THE DRAWINGS 10 map depiction
12 major road
14 point of interest
16 vehicle icon
18 dialog box
20 action button
22 fleet manager glyph
24 flame
26 candlestick
28 flame symbology
30 pickup task symbol
32 drop off task symbol
34 driving mode indicator
36 fleet manager display 38 unassigned vehicle pool
40 task queue
42 vehicle manager
44 swim lane
46 vehicle manager glyph
48 flame
50 candlestick
52 actual progress line
54 time to completion
56 elapsed time
58 timeline hash marks
60 time compression symbol
62 current task symbol
64 next task symbol
66 vertical bar
68 expected progress line
70 red bar
72 green bar
74 vehicle manager display
76 stacked task
78 directed mode symbol

DETAILED DESCRIPTION OF THE INVENTION

The present invention may be applied to many different operational paradigms. One good exemplary paradigm is that of vehicle fleet management. Accordingly, these descriptions will focus on the example of vehicle management and use this paradigm to explain how the inventive concepts may be applied. The reader should bear in mind, however, that the inventive concepts are equally applicable to many other fields.

The invention provides a graphical interface with these over-arching goals: (1) Helping fleet managers to maintain awareness of all the vehicles under control; (2) Identifying and anticipating vehicles in need of assistance; (3) Prioritizing and acting upon those needs appropriately. The invention uses moving representative glyphs to achieve these goals. The word "glyph" in this context means a graphical symbol configured to quickly convey various meanings about one vehicle or a group of related vehicles.

In this fleet management scenario, multiple vehicle managers are under the supervision of a fleet manager. The fleet manager is responsible for all the vehicles under control, while each vehicle manager is responsible for a subset of the total number of vehicles. It is preferable to provide different displays for the fleet manager and the vehicle managers, since a different level of detail will be desired for each. FIGS. 3 through 7 depict examples of the fleet manager display.

Figure 3:
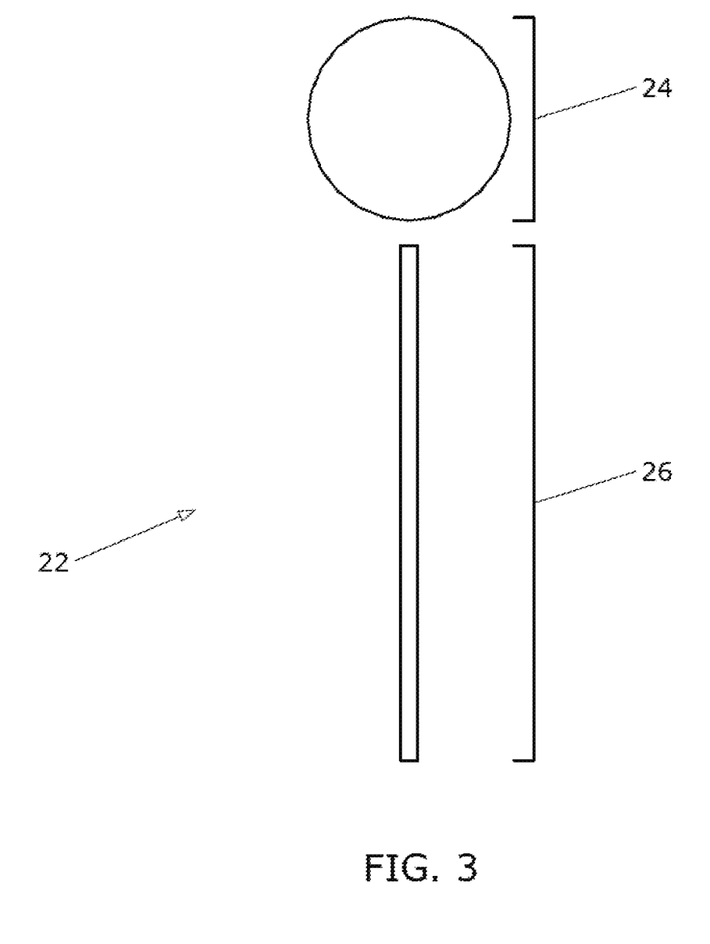
FIG. 3 depicts a glyph that represents a vehicle in a fleet manager display.
Figure 4:
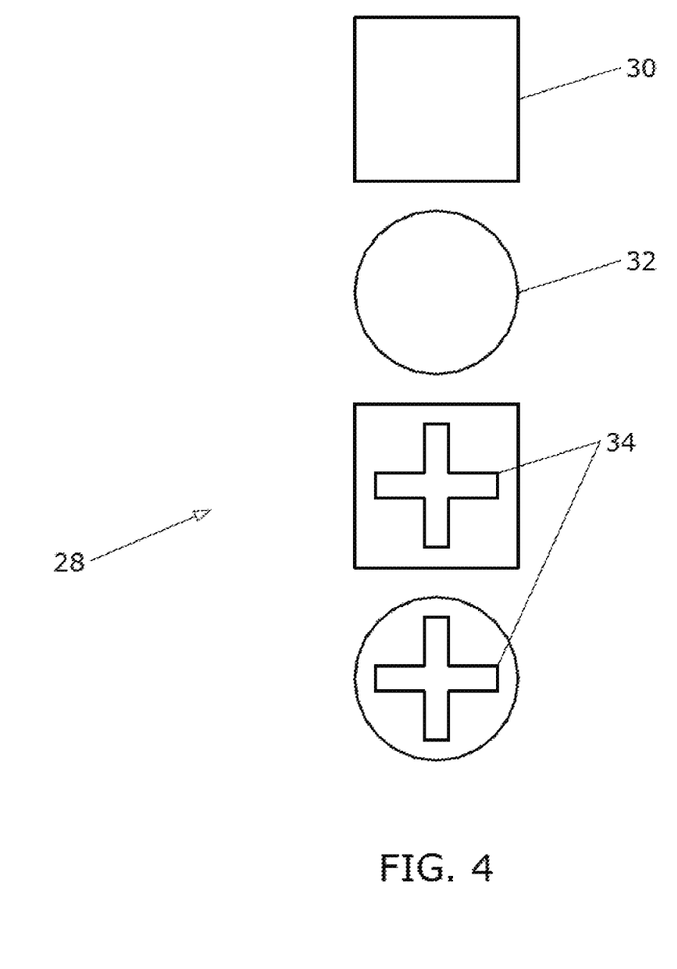
FIG. 4 depicts some exemplary symbology to be used with the glyph.

FIG. 3 shows a vehicle glyph used in the fleet manager display 22. It includes two main components—flame 24 and candlestick 26. Different symbols may be used for the flame to convey different meanings. The length of candlestick 26 also varies to convey different meanings. FIG. 4 shows an exemplary assortment of symbols that can be used for the flame (flame symbology 28). The pickup task symbol 30 indicates a vehicle that is presently tasked to proceed to a defined point and pickup a passenger. Drop off symbol 32 indicates a vehicle that is presently carrying a passenger to a defined drop-off point.

The vehicles in this example are autonomous—meaning that they are primarily controlled by software rather than a human operator. However, the remote vehicle managers have the ability to interact with the vehicle and its contents including assuming manual control in order to operate the vehicle. Mode indicators 34 may be used to indicate manual control. The lack of a mode indicator denotes automatic control of the particular vehicle.

Figure 5:
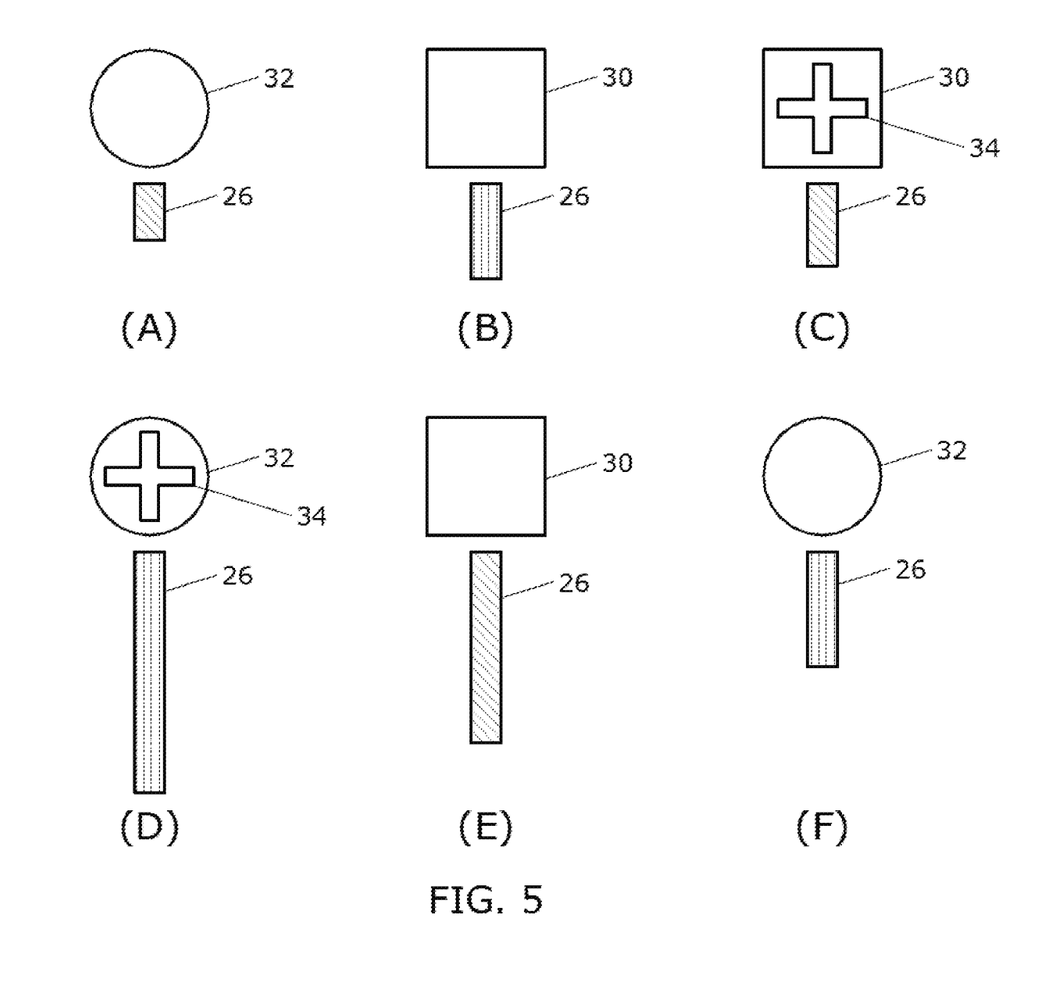
FIG. 5 depicts several examples of the symbology used for glyphs in the fleet manager display.

FIG. 5 shows six examples of how the vehicle glyph may appear in the fleet manager display. In this embodiment the following principles apply:

(1) Fame shape—indicates task;
(2) Flame background (empty/filled)—indicates whether a vehicle is occupied;
(3) Flame inner shape—indicates operating mode,
(4) Flame color—indicates issue type (passenger request, breakdown, etc.);
(5) Candlestick—indicates status and progress;
(6) Brackets around flame—Indicates selected/attended to In the version shown in FIG. 5, the color of the candlestick indicates whether the vehicle is presently ahead of or behind its anticipated schedule. Green indicates that the vehicle is ahead of schedule while red indicates that the vehicle is behind schedule. The length of candlestick 26 indicates how far ahead of or behind schedule the vehicle is.

The glyph shown in FIG. 5(A) is topped by a drop off task symbol 32, indicating that the vehicle is presently carrying a passenger to a defined drop off point. Candlestick 26 is green in color, indicating that the vehicle is presently ahead of schedule. Candlestick 26 is short, indicating that the vehicle is only slightly ahead of schedule.

The glyph in FIG. 5(B) is topped by a pickup task symbol 30, indicating that the vehicle is presently empty and moving toward a defined pickup point. An empty task symbol indicates that the vehicle is unoccupied. A filled flame means that the vehicle is occupied. However, an occupied vehicle may still be proceeding to another pickup. In the example of FIG. 5(B) candlestick 26 is red, indicating that the vehicle is behind schedule. Candlestick 26 is of a medium length, indicating that the vehicle is moderately behind schedule.

The glyph in FIG. 5(C) is topped by a pickup task symbol 30, indicating that the vehicle is presently moving toward a defined pickup point. The '+' mode indicator 34 is present in the pickup symbol, indicating that the vehicle is being manually controlled. Candlestick 26 is green, indicating that the vehicle is ahead of schedule. The medium length of candlestick 26 indicates that the vehicle is moderately ahead of schedule.

The glyph in FIG. 5(D) is topped by a drop off task symbol 32, carrying the meaning described previously. The mode indicator 34 in the drop off symbol indicates that the vehicle is being manually controlled. Candlestick 26 is red, indicating that the vehicle is behind schedule. The long length of candlestick 26 indicates that the vehicle is badly behind schedule.

The glyph shown in FIG. 5(E) is topped by a pickup task symbol 30, indicating that the vehicle is presently moving toward a defined pickup point. Candlestick 26 is green and moderately long, indicating that the vehicle is moderately ahead of schedule.

The glyph in FIG. 5(D) is topped by a drop off symbol 32, carrying the meaning described previously. Candlestick 26 is red, indicating that the vehicle is behind schedule. The moderate length of candlestick 26 indicates that the vehicle is moderately behind schedule.

Figure 6:
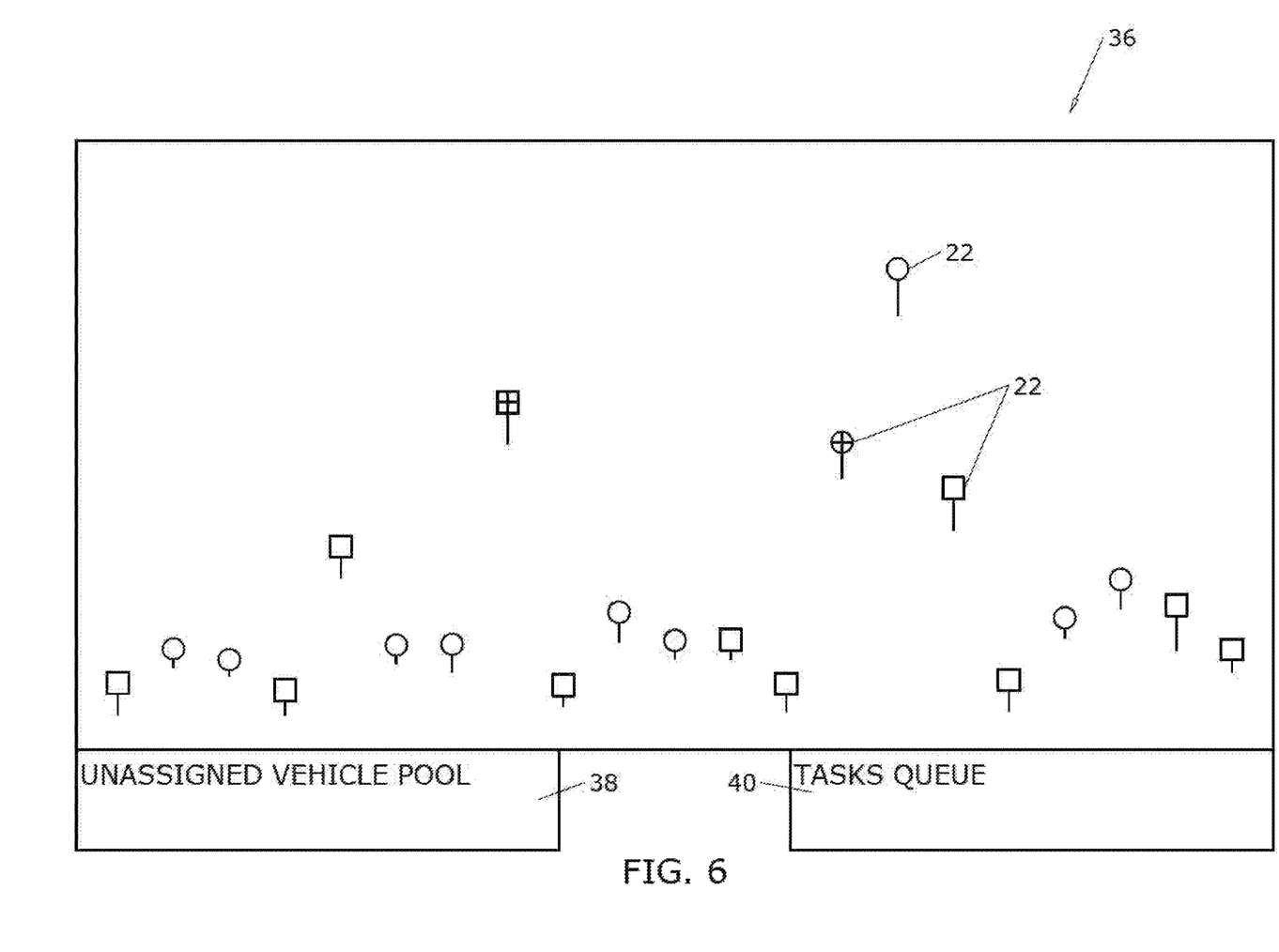
FIG. 6 depicts an exemplary fleet manager display.

FIG. 6 shows the use of fleet manager glyphs 22 in fleet manager display 36. Each glyph 22 contains the visual characteristics described previously. In this example, each glyph represents a single vehicle being managed. Unassigned vehicle pool 38 represents additional vehicles available to perform tasks. Tasks queue 40 depicts tasks waiting to be assigned to a vehicle (such as a passenger pickup or drop off).

An actual display might show many more glyphs than depicted. Some glyphs may even occlude other glyphs—meaning that some glyphs are depicted as being in the foreground and others are depicted as being in the background. It is obviously impractical for the fleet manager viewing such a display to carefully observe each one of the individual glyphs. The inventive display therefore uses a motion-based depiction to direct attention to vehicle's needing attention.

The motion-based depiction is referred to as the "fish bowl analogy." Glyphs needing attention rise toward the top of the display while glyphs needing no attention remain at the bottom. The vertical position on the display indicates the degree of urgency as to any particular glyph. Further, the rate of change of position may be used to indicate the rate of change of urgency.

In the example of FIG. 6 one particular glyph is obviously highest and therefore most in need of attention. Other glyphs are at an intermediate altitude while still others are clustered near the bottom. The glyphs near the bottom may be safely assumed to need no attention.

The direction of a glyph's movement may also be used to indicate a trend. For example, the glyph in the left central portion of the display has a moderate altitude. It also has a cross in the flame portion, indicating that manual control of that vehicle has been assumed. This may have occurred because the vehicle encountered a construction area and needed to be rerouted. The delay caused the vehicle to fall behind schedule (hence the fairly long candlestick, which is red in color). However, the vehicle has been successfully rerouted and is now moving well. The display therefore causes the glyph to move downward—indicating that its condition is improving. The fleet manager sees this glyph as standing out (because of its altitude). However, because its motion is downward, the manager knows it may need no further attention (assuming the downward motion continues).

The same motion-based indication applies to a glyph having a low altitude that is ascending rapidly. This position and motion tells the fleet manager that the vehicle depicted by that glyph may not be far behind schedule but that it has encountered a condition that will rapidly make things worse (such as a breakdown).

Figure 7:
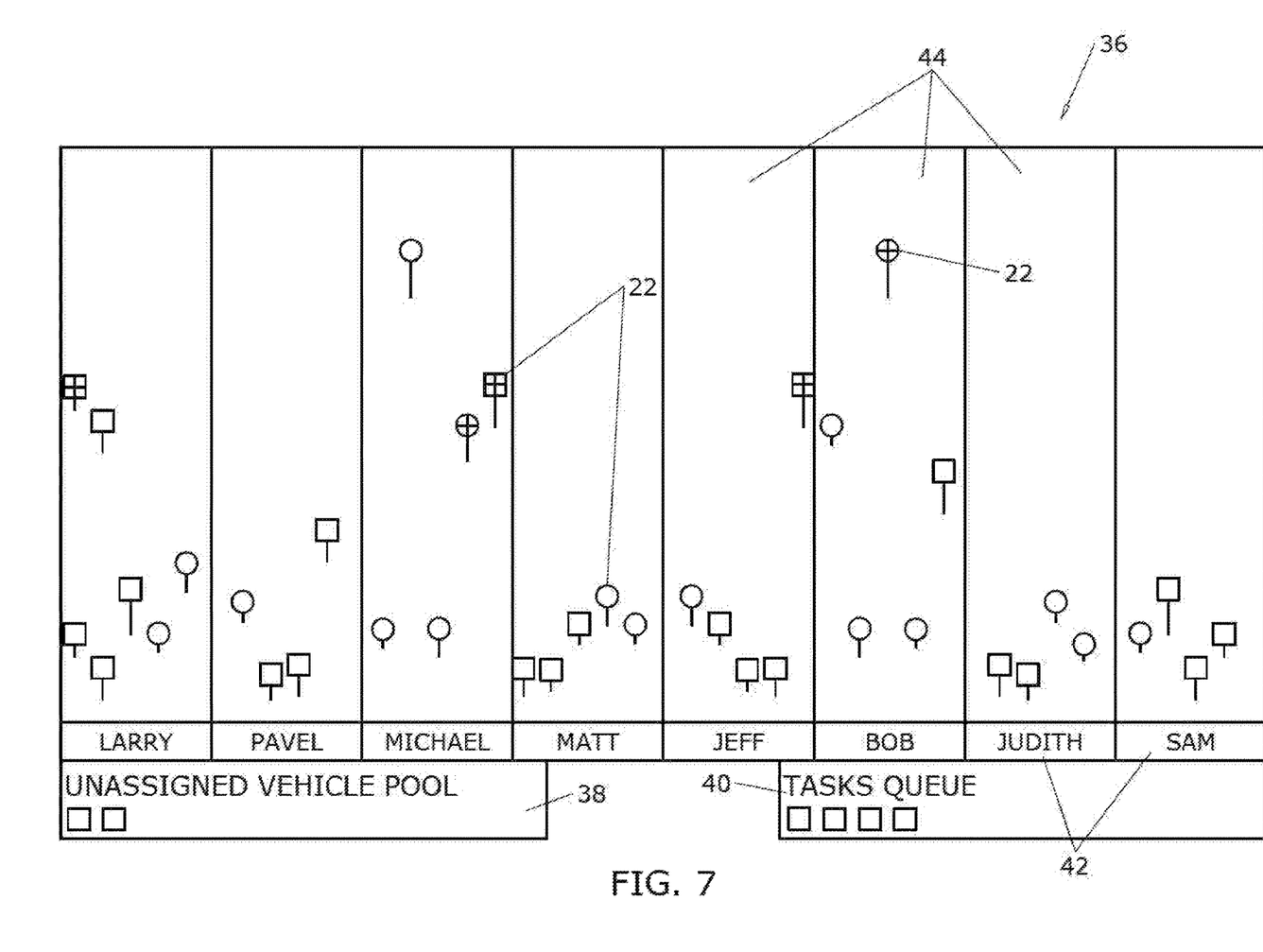
FIG. 7 depicts the fleet manager display of FIG. 6 reorganized according to vehicle manager.

The fleet manager display preferably also allows the user to reorganize the glyphs according to different criteria. For example, a single fleet manager might be tasked with allocating vehicles among several vehicle managers. The fleet manager might wish to change the display in order to show the glyphs via the managers managing them. FIG. 7 shows what this might look like. Each vehicle manager 42 is assigned a lane 44 in the view and the vehicles assigned to each manager are shown in the lane. This depiction is referred to as the "swim lane view."

With this change it is readily apparent that Larry is currently carrying quite a few vehicles (including two with current problems) while Pavel is lightly loaded. Armed with this depiction, the fleet manager might transfer some of Larry's vehicles to Pavel. The inventive interface allows the fleet manager to make selections, preferably by picking on a particular glyph and dragging it into another lane. This action could automatically transfer that vehicle and create a pop-up notice on the display of the two vehicle managers involved.

Figure 8:
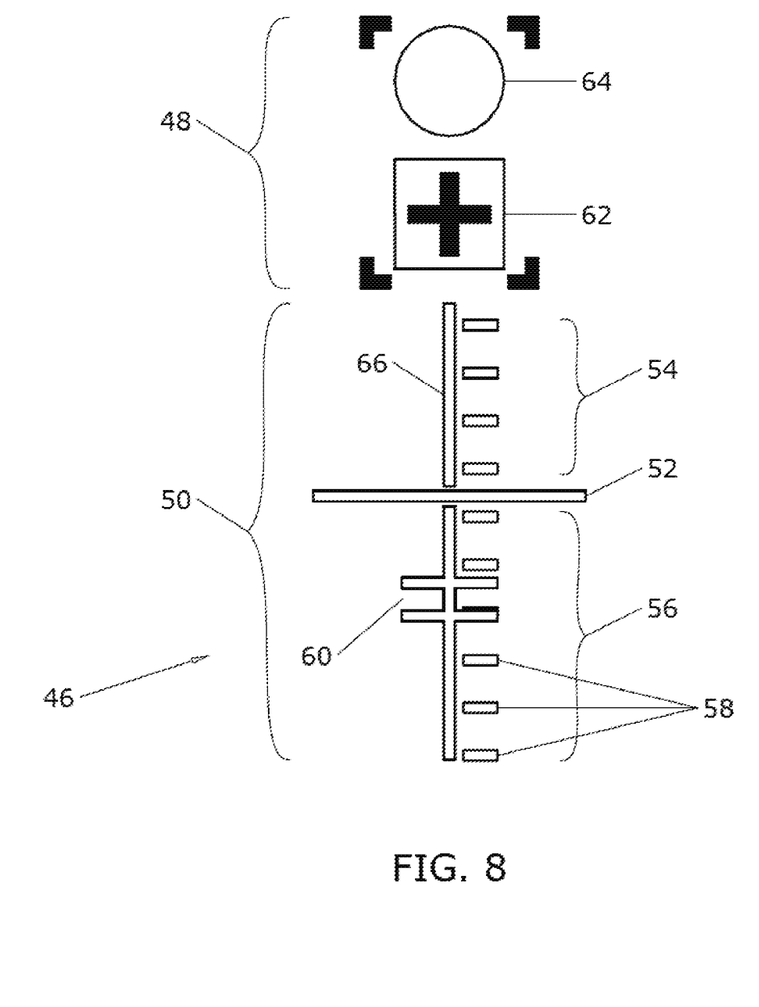
FIG. 8 depicts a glyph that represents a vehicle in a vehicle manager display.

FIGS. 8-12 depict a representative vehicle manager display using the same inventive concepts. FIG. 8 depicts a vehicle glyph 46—configured for use on the vehicle manager display. The user will note that this glyph is much more detailed than that created for the fleet manager. The vehicle manager is expected to monitor far fewer vehicles much more closely and thus a more detailed glyph can be used without overwhelming the user.

The general layout of vehicle glyph for the vehicle manager display 46 is similar to the glyph used for the fleet manager. It includes a flame 48 and candlestick 50. Flame 48 uses the same symbology as the flame in the fleet manager glyph. However, it is possible to display multiple tasks within flame 48. Current task symbol 62 represents what the vehicle is doing right now whereas next task symbol 64 indicates what it is tasked to do subsequently.

Candlestick 50 replaces the candlestick shown for the fleet manager glyph and it contains much more information. Vertical bar 66 represents a time scale. Actual progress line 52 represents where the vehicle is along its route at a particular time. A horizontal line indicating the vehicle's actual progress 52 begins near the bottom of vertical timeline bar 66 and travels upward as the vehicle moves along. Thus, elapsed time 56 represents time the vehicle has already been traveling and time-to-completion 54 represents the time remaining until the vehicle is expected to reach its destination. Hash marks 58 are preferably provided so that the user may more easily gauge the position of the actual progress line 52 as well as the length of the current task's elapsed time 56 and remaining time 54.

For long routes it may be impractical to depict the scaled length of the vertical bar (as it would be too long). In these instances time compression symbol 60 may be added to inform the user that the actual expected time of travel is longer than depicted. The time compression symbol shows a number of hash marks both wider and much closer together than the ordinary hash mark spacing. Since each hash mark represents an interval of time, placing them close together in the time compression symbol enables representing long time periods in a small space using multiple hash marks to accurately indicate how many time intervals have been compressed into the symbol.

The inventive system preferably has access to route and time calculators so that (1) the route of a particular vehicle is automatically determined, and (2) the expected rate of progress of the vehicle along that route is also determined (including factoring in the time of day, historical traffic data, etc.). Those skilled in the art will know that such calculators already exist.

Figure 9:
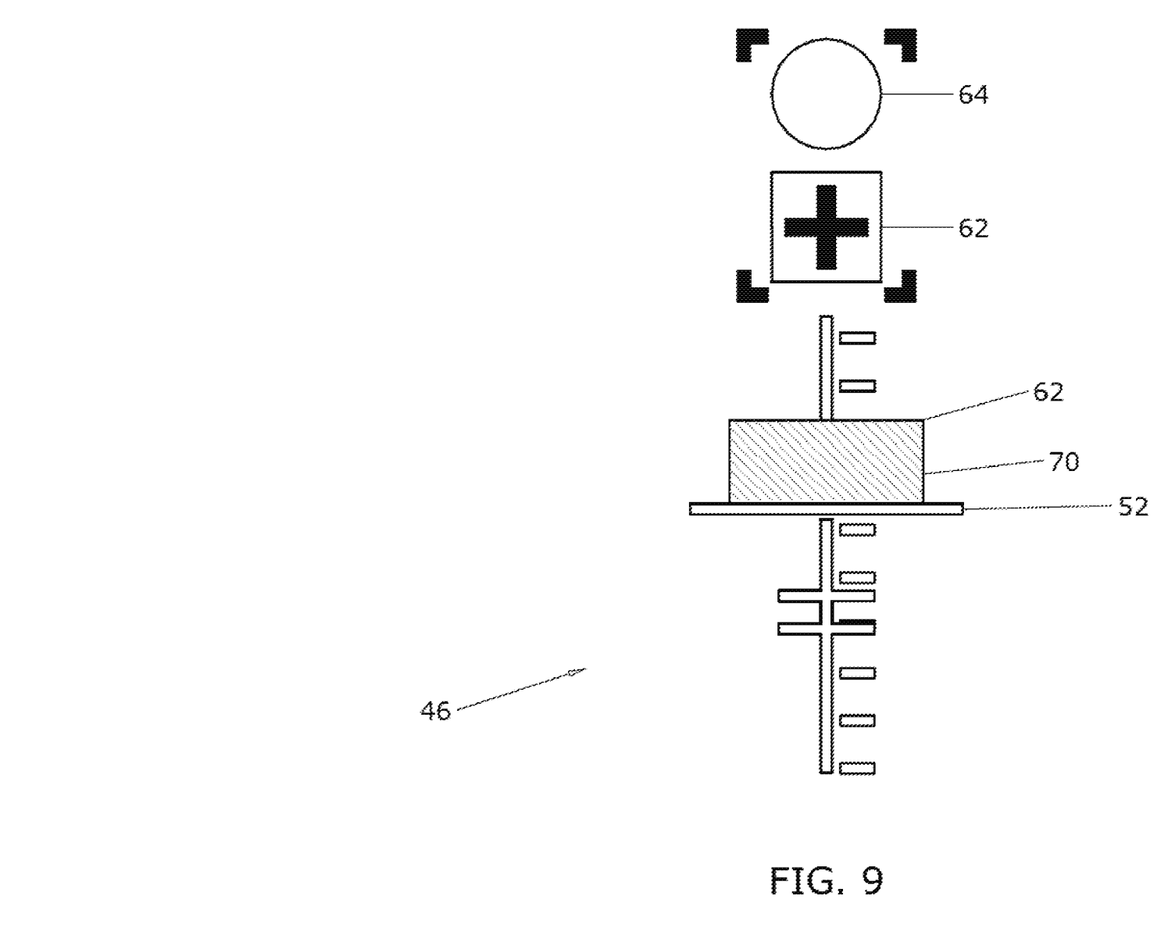
FIG. 9 shows an example of the vehicle manager glyph in operation.
Figure 10:
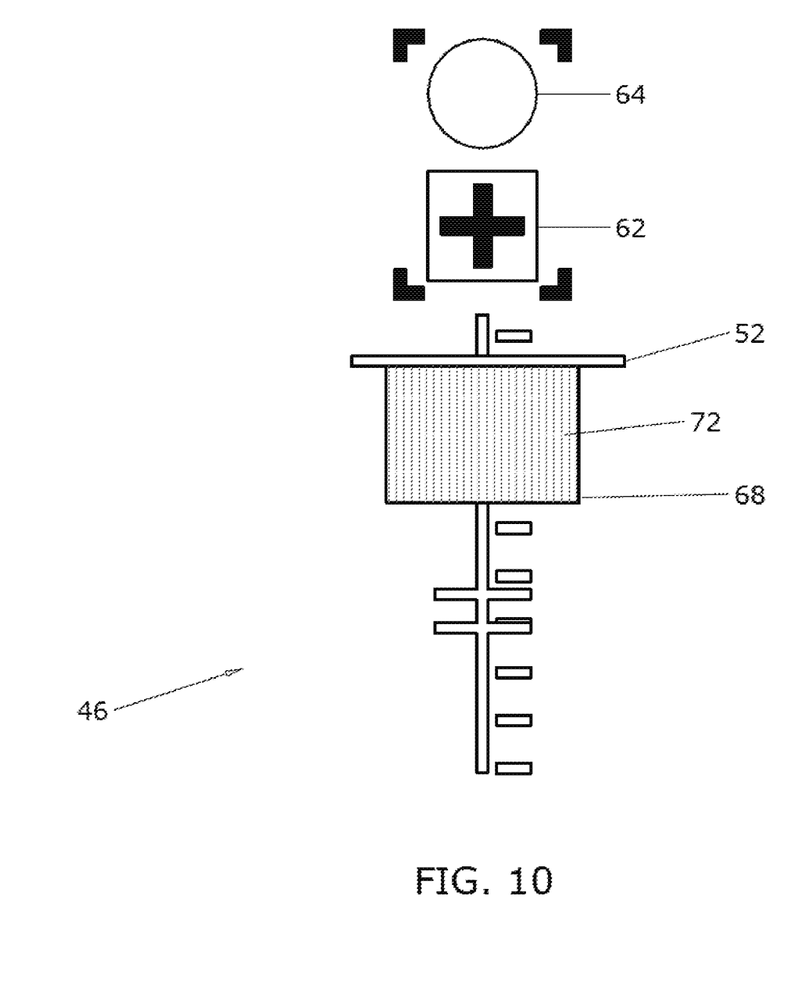
FIG. 10 shows an example of the vehicle manager glyph in operation.

It is helpful for the glyph to rapidly indicate whether a particular vehicle is ahead of or behind its calculated schedule. FIGS. 9 and 10 show one way of depicting this value. Actual progress line 52 again depicts where the vehicle is along its route. Expected progress line 68 depicts where the rate of progress calculator determined that the vehicle should be at that particular instant in time. The vehicle corresponding to the glyph of FIG. 9 is behind schedule (actual progress line 52 is lower on the vertical bar than expected progress line 68). A colored bar is created between the two lines. For instances where the vehicle is behind schedule this is red bar 70. A vehicle falling behind schedule will display a red bar above the actual progress line 52 and the red bar will grow taller as the vehicle falls further behind schedule.

FIG. 10 depicts the opposite scenario. For this vehicle, actual progress line 52 is above expected progress line 68, indicating that the vehicle is ahead of the calculated time for the route. Green bar 72 is created between the two lines. Thus, a vehicle that is ahead of schedule will display a green bar that will grow taller as the vehicle gets further ahead of schedule.

Figure 11:
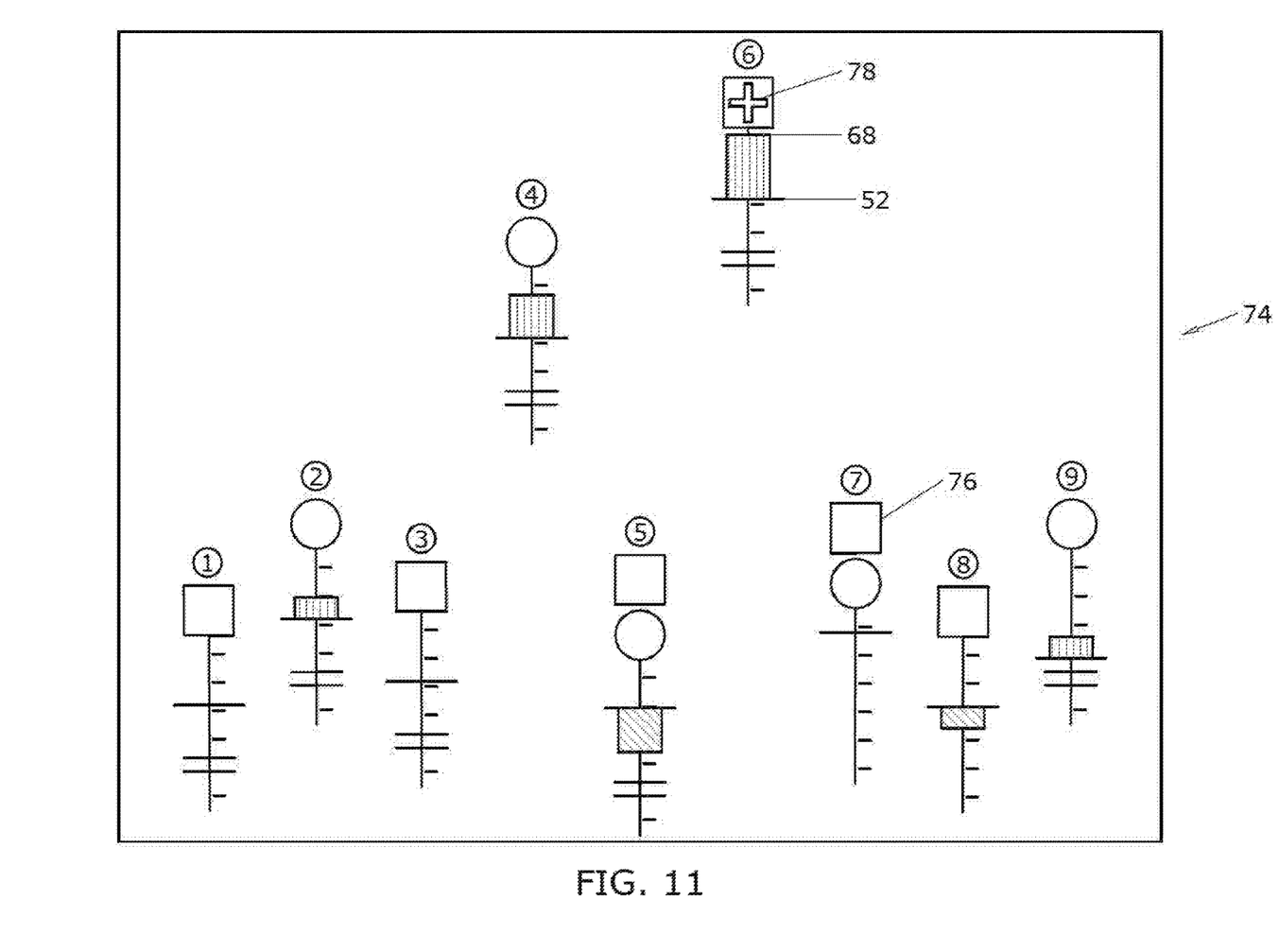
FIG. 11 shows a vehicle manager display.

FIG. 11 shows a vehicle manager display 74. This display would typically be viewed by an individual vehicle manager. The glyphs depicted represent all the vehicles under that manager's control at a given time. The glyphs may be provided with a reference number or other indicia as shown. The "fish bowl analogy" is applied to this display as well. A condition of increasing urgency is depicted by the altitude of the glyph on the display. From this view, it is apparent that two vehicles (glyphs 4, 6) are problematic. Both corresponding vehicles are running far behind schedule.

The vehicle manager has assumed manual control of vehicle 6. This condition is shown by the presence of directed mode symbol 78. The user also notices that glyph 9 is ascending. The interface preferably gives the user the ability to group and reorganize the glyphs in different ways. For example, the user may request that the glyphs be reorganized according to geographic proximity.

Figure 12:
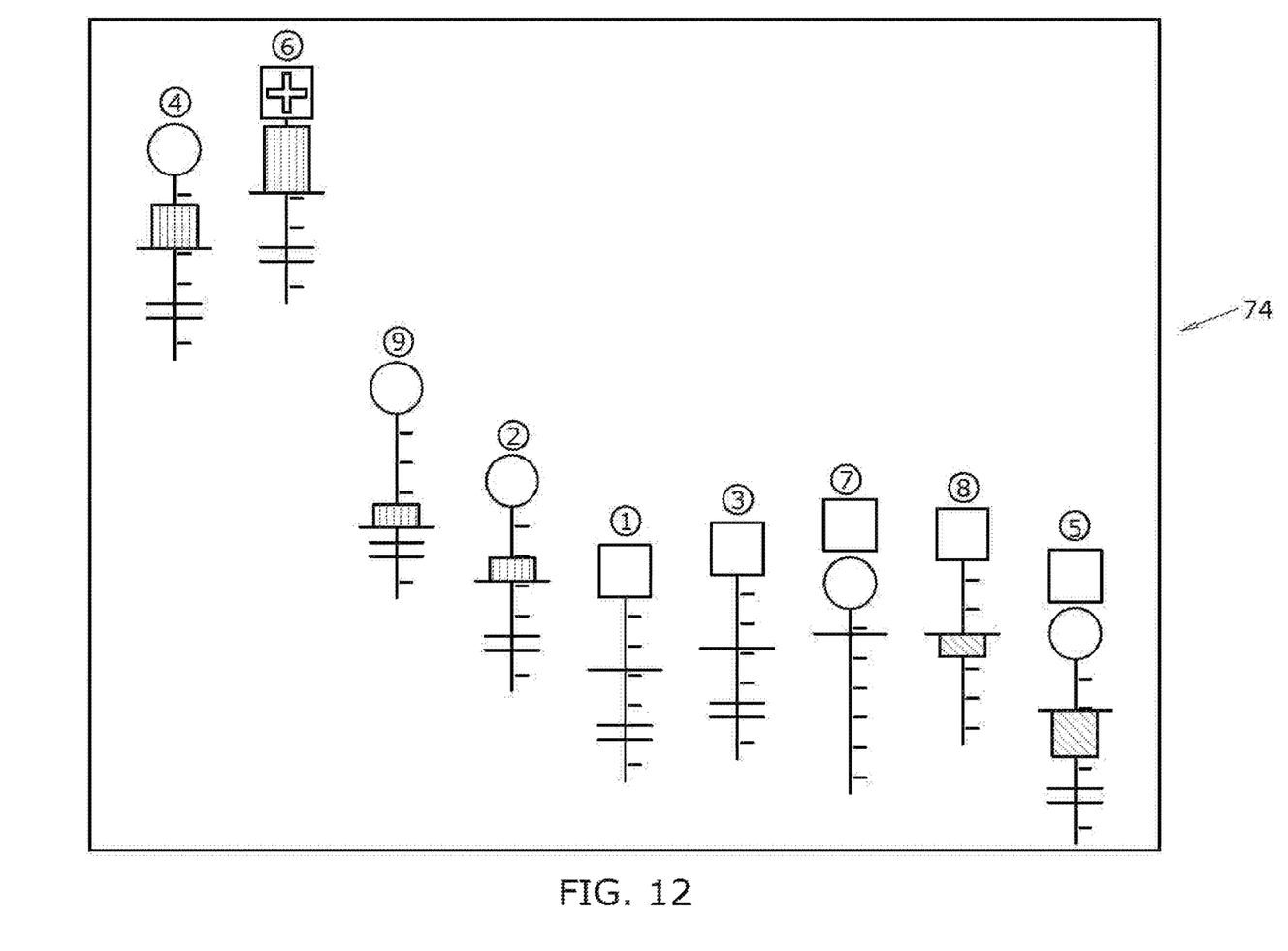
FIG. 12 shows the vehicle manager display of FIG. 11 reorganized by geography.

FIG. 12 shows the display after clustering by geographic proximity has been implemented. It is now readily apparent that four vehicles in close proximity (glyphs 4, 6, 9, and 2) are falling behind schedule. The user may then pull up a geographic map and see that all the vehicles are traveling near a sport venue where an event is being held. The vehicle manager may then reroute the vehicles to avoid this area. Further, the vehicle manager may ask the system to determine which other vehicles are headed toward the same geographic area and reroute them as well.

The ability to project future conditions is preferably a significant part of the inventive display. If the operator makes the system aware of a geographically-based problem, then the display changes accordingly. This feature will be explained with respect to FIG. 11. Glyph 8 represents a vehicle that is currently ahead of schedule. However, if the system is told of a traffic jam area and then determines that vehicle 8 is currently routed toward the jam, glyph 8 will begin to rise on the display. This indicates to the manager that vehicle 8 needs attention even though glyph 8 indicates that the current condition of the vehicle is good.

One method of monitoring for such a condition is to consider each vehicle's short-term average velocity. Software presently exists to calculate an expected short-term average velocity for each vehicle along a calculated route. "Short term" in this context means long enough to account for traffic lights and similar conditions. A 5 minute interval works in many cases. A vehicle's short term average velocity can then be continuously compared to its expected short term average velocity ("STAV"). If the actual STAV falls below the expected STAV then the display can be configured to case the vertical position of that vehicle's glyph to rise. A rate of change can also be depicted. If the vehicle's actual STAV is falling increasingly below the expected STAV then the vehicle's glyph can be given a corresponding vertical velocity.

The expected STAV calculations can incorporate real-time information on traffic and other conditions such as rain. Traffic cameras may also be incorporated to visualize conditions at actual intersections and incorporate these conditions in the calculations. All these techniques are known to those skilled in the art and may be incorporated in the present invention.

In some embodiments two parameters may be used to determine a glyph's vertical position and velocity. The first parameter can be the difference between the vehicle's actual progress and its expected progress. A second parameter can be the difference between the vehicle's actual STAV and its expected STAV. In other embodiments the operator may be given the option of switching between the two parameters. In other words, the display may be set to consider only the first parameter and the display may then be switched to consider only the second parameter. As another option, a first parameter could be mapped to a first axis of motion and a second parameter could be mapped to a second axis of motion.

Other graphical features may be added to the glyphs as well. If one considers the vehicle manager glyph of FIG. 8, it is possible to indicate additional conditions by color coding some of the components. For example, the flame symbology could be depicted as white for normal, or blue when there is a passenger request. Likewise, a passenger request could be ranked as the most urgent condition. A passenger request would then cause the flame to turn blue and the glyph to ascend toward the top of the display.

It will be readily apparent to the reader that the inventive graphical depictions this described could be applied to many different fields. As non-limiting examples, the inventive graphical depictions could be used to:
1. Monitor fleets of aircraft, busses, trucks, as well as other vehicle types and tasks.
2. Monitor package pickup and delivery tasks,
3. Monitor the progress of individual students through a training program such as flight training,
4. Monitor the performance of individual securities in a stock portfolio.

The preceding description contains significant detail regarding the novel aspects of the present invention. It is should not be construed, however, as limiting the scope of the invention but rather as providing illustrations of the preferred embodiments of the invention. As an example, the nature of the graphical interface provided to the users could take many different forms. A horizontal axis of motion could be used instead of a vertical axis or could be combined with a vertical axis. Many other variations are possible. Thus, the scope of the invention should be fixed by the claims ultimately drafted, rather than by the examples given.

The invention claimed is:

1. A method of graphically depicting a current state of a plurality of objects, wherein a first parameter is known for each of said plurality of objects, in order to allow a manager to perceive those objects requiring attention, comprising:
 (a) providing a graphical display;
 (b) providing a representative glyph for each of said plurality of objects on said graphical display;
 (c) providing an axis of motion for said graphical display;
 (d) wherein a position of each of said glyphs along said axis of motion is related to a current degree of urgency of said first parameter for each of said objects; and
 (e) wherein a rate of motion of each of said glyphs along said axis of motion is related to a current rate of change of said degree of urgency of said first parameter for each of said objects.

2. The method of graphically depicting a current state of a plurality of objects as recited in claim 1, wherein:
 (a) said axis of motion is vertical; and
 (b) a change in said degree of urgency of said first parameter for a particular object is depicted as a change in elevation of said glyph corresponding to said particular object along said vertical axis.

3. The method of graphically depicting a current state of a plurality of objects as recited in claim 2, wherein a rate of change of said degree of urgency of said first parameter for a particular object is depicted as a velocity of said glyph corresponding to said particular object along said vertical axis.

4. The method of graphically depicting a current state of a plurality of objects as recited in claim 1, wherein:
   (a) said first parameter for each of said objects is an amount of progress along a route for a vehicle; and
   (b) said degree of urgency of said first parameter is a difference between said vehicle's said actual progress along a route compared to said vehicle's expected progress along said route.

5. The method of graphically depicting a current state of a plurality of objects as recited in claim 4, wherein:
   (a) said axis of motion is vertical;
   (b) a change in said degree of urgency in said first parameter for a particular object is depicted as a change in elevation of said glyph corresponding to said particular object along said vertical axis; and
   (c) a rate of change of said degree of urgency of said first parameter for a particular object is depicted as a velocity of said glyph corresponding to said particular object along said vertical axis.

6. The method of graphically depicting a current state of a plurality of objects as recited in claim 5, wherein a glyph corresponds to a vehicle that is behind schedule is depicted higher on said vertical axis.

7. The method of graphically depicting a current state of a plurality of objects as recited in claim 5, wherein a glyph corresponding to a vehicle that is falling further behind schedule is given an upward velocity along said vertical axis.

8. The method of graphically depicting a current state of a plurality of objects as recited in claim 4, wherein a second parameter for each of said objects is a difference between said vehicle's short-term average velocity and said vehicle's expected short-term average velocity.

9. The method of graphically depicting a current state of a plurality of objects as recited in claim 8, wherein:
   (a) a position of each of said glyphs along said axis of motion is related to a degree of urgency in said second parameter for each of said vehicles, and
   (b) a rate of motion of each of said glyphs along said axis of motion is related to a current rate of change of said degree of urgency in said second parameter for each of said vehicles.

10. The method of graphically depicting a current state of a plurality of objects as recited in claim 9, wherein:
    (a) said axis of motion is vertical;
    (b) a change in said degree of urgency in said second parameter for a particular vehicle is depicted as a change in elevation of said glyph corresponding to said particular vehicle along said vertical axis; and
    (c) a rate of change of said degree of urgency in said second parameter for said particular vehicle is depicted as a velocity of said glyph corresponding to said particular vehicle along said vertical axis.

\* \* \* \* \*